United States Patent [19]

Schievelbein et al.

[11] 4,161,982

[45] Jul. 24, 1979

[54] HIGH CONFORMANCE ENHANCED OIL RECOVERY PROCESS

[75] Inventors: Vernon H. Schievelbein; Mohan V. Kudchadker; James E. Varnon, all of Houston; Lawrence E. Whittington, Katy, all of Tex.

[73] Assignee: Texaco Inc., White Plains, N.Y.

[21] Appl. No.: 863,502

[22] Filed: Dec. 22, 1977

[51] Int. Cl.² .............................................. E21B 43/22
[52] U.S. Cl. ..................................... 166/269; 166/273
[58] Field of Search ..................... 252/8.55 R, 8.55 D; 166/273, 274, 269

[56] References Cited

U.S. PATENT DOCUMENTS

| | | | |
|---|---|---|---|
| 3,294,164 | 12/1966 | Hardy et al. | 166/274 |
| 3,358,758 | 12/1967 | Hardy et al. | 166/274 |
| 3,827,497 | 8/1974 | Dycus et al. | 166/274 |
| 3,866,680 | 2/1975 | Dauben | 166/273 |
| 3,977,471 | 8/1976 | Gale et al. | 166/273 |
| 4,018,278 | 4/1977 | Shupe | 252/8.55 X |

Primary Examiner—Herbert B. Guynn
Attorney, Agent, or Firm—Carl G. Ries; Thomas H. Whaley; Jack H. Park

[57] ABSTRACT

The conformance of an enhanced oil recovery process, including water flood, surfactant or other chemicalized water flood process, in a formation containing at least two zones of varying permeability, the permeability of one zone being at least 50 percent greater than the permeability of the other zone, is improved by flooding until the higher permeability zone has been depleted, after which a fluid is injected into the high permeability zone, said fluid having relatively low viscosity at the time of injection and containing a mixture of surfactants or surface active agents which promote the formation of a coarse emulsion in the flow channels of the formation which reduces the permeability of the high permeability zone. Since the viscosity of the fluid injected into the previously flooded, high permeability zone is no greater than water, it is injected easily into the zone and moves through substantially the same flow channels as water would move in the formation. After the permeability of the first zone has been reduced substantially, water flooding may then be accomplished in the second zone which was originally not invaded by the injected water since its permeability was substantially less than the permeability of the first zone.

25 Claims, 2 Drawing Figures

HIGH CONFORMANCE ENHANCED OIL RECOVERY PROCESS

FIELD OF THE INVENTION

This invention concerns a process for use in subterranean petroleum formations containing two or more zones which differ from one another in permeability such that water flooding or other enhanced oil recovery processes cannot effectively deplete both zones, resulting in poor vertical conformance. More specifically, the process involves injecting a fluid into the more permeable zone, after it has been depleted by water flooding or other supplemental oil recovery process, which fluid has relatively low viscosity at the time of injection but forms a high viscosity, coarse emulsion with the residual hydrocarbon in the depleted zone to reduce the permeability of that zone to subsequently injected fluids.

BACKGROUND OF THE INVENTION

It is well recognized by persons skilled in the art of petroleum recovery that only a small fraction of the petroleum originally present in a formation can be recovered by primary production, e.g., by allowing the oil to flow to the surface of the earth as a consequence of naturally occuring energy forces, or by so called secondary recovery processes which comprise injecting water into the formation by one or more wells to displace petroleum through the formation toward one or more spaced apart production wells and then to the surface of the earth. Although water flooding is an inexpensive supplemental oil recovery process, water does not displace oil effectively even in those portions of the formation through which it passes, because water and oil are immiscible and the interfacial tension between water and oil is quite high. This too has been recognized by persons skilled in the art of oil recovery, and many surface active agents or surfactants have been proposed for addition to the flood water, which materials reduce the interfacial tension between the injected aqueous fluid and the formation petroleum thereby increasing the microscopic displacement efficiency of the injected aqueous fluid. Surfactants which have been disclosed in the prior art for such purposes include alkyl sulfonates, alkylaryl sulfonates, petroleum sulfonates, alkyl or alkylarylpolyalkoxy sulfates, alkyl- or alkylarylpolyalkoxyalkyl sulfonates, and nonionic surfactants such as polyethoxylated aliphatic alcohols or alkanols, and polyethoxylated alkyl phenols.

Even if the surface tension between the injected aqueous fluid and the petroleum present in the subterranean reservoir can be reduced by incorporating surface active agents into the injected fluid, the total oil recovery efficiency of the process is frequently poor because many subterranean petroleum-containing reservoirs are comprised of a plurality of layers of widely differing permeabilities. When a fluid is injected into such a heterogeneous reservoir, the fluid passes primarily through the most permeable zones and little or none of the fluid passes through the lower permeability zones. If the ratio of permeabilities of the zones is as high as 2:1, essentially all of the injected fluid passes through the more permeable zone to the total exclusion of the less permeable zone. Furthermore, the situation described immediately above causing poor vertical conformance of the injected fluid in a heterogeneous reservoir is aggravated by application of the supplemental oil recovery process itself. If water is injected into a heterogeneous multilayered petroleum reservoir, water passes principally through the most permeable zone and displaces petroleum therefrom, and as a consequence further increases the permeability of that zone. Accordingly, the difference between the permeability of the most permeable zone and the lesser permeable zone or zones is increased as a consequence of applying a fluid displacement oil recovery process thereto, including water flooding, surfactant flooding, etc.

The above described problem of poor vertical conformance in water flooding operations has also been recognized by persons skilled in the art, and numerous processes have been described in the prior art for treating the formation to correct the problems resulting from injecting an oil-displacing fluid into a formation having two or more zones of significantly different permeabilities. Many of the these processes involve the use of hydrophilic polymers including partially hydrolyzed polyacrylamide, copolymers of acrylamide and acrylic acid or water soluble acrylates, polysaccharides, etc. Unfortunately, the fluids employing these hydrophilic polymers are substantially more viscous than water at the time of injection, and so injection into the zones is difficult and there is little assurance that they will invade the same zones as would water or another aqueous fluid having about the same viscosity as water. Accordingly, the effectiveness of the above-described processes has been restricted to reducing the permeability of only the most permeable flow channels in a zone, and is furthermore usually restricted only to the near wellbore zone of the formation, e.g. that portion of the most permeable zone in a formation immediately adjacent to the injection well, because of the difficulty of injecting viscous fluids through great portions of the formation.

In view of the foregoing discussion of the problems associated with poor vertical conformance in heterogeneous formations, it can be appreciated that there is a substantial need for a method of treating such formations to reduce the permeability of the very high permeability zones to force subsequently injected oil displacing fluids to pass into those zones which were originally of lower permeability, and so were not invaded by the first injected fluids.

DESCRIPTION OF THE PRIOR ART

Numerous references suggest the formation of viscous emulsions on the surface, and injecting the emulsion into a subterranean formation for the purpose of decreasing the permeability of a zone which is substantially more permeable than other zones. These include U.S. Pat. No. 3,149,669; U.S. Pat. No. Re. 27,198 (original patent U.S. Pat. No. 3,44,636); U.S. Pat. No. 3,502,146 (1970); and U.S. Pat. No. 3,866,680 (1975). U.S. Pat. Nos. 3,827,497 and 3,890,239 describe surfactant waterflooding processes using a mixture of an organic sulfonate and a sulfonated oxyalkylated alcohol.

SUMMARY OF THE INVENTION

We have discovered a process applicable to a subterranean ranean, petroleum-containing formations containing two or more zones, at least one of which has a permeability at least 50 percent greater than the other zone, which will permit more effective water flooding or surfactant flooding in both zones. The process involves first injecting water or other aqueous displacing fluid into the formation to pass through the more permeable zone, displacing petroleum therefrom, until the ratio of injected fluid to formation petroleum of fluids being recovered from the formation reaches a predetermined or economically unsuitable level. This further increases the ratio of the permeability of the most permeable zone to the permeability of the lesser permeable zone or zones. Thereafter an aqueous fluid is injected into the formation, which fluid will pass substantially exclusively into and through the most permeable, previously water flooded zone, which fluid has a viscosity not substantially greater than the viscosity of water, said fluid containing a surfactant mixture which readily emulsifies the residual oil present in the previously water flooded zone. The surfactants present in the injected treating fluid must form a stable emulsion with the formation petroleum at the formation temperature and at a salinity about equal to the salinity of the aqueous fluid present in the previously flooded, high permeability zone, and should also be relatively stable with changes in salinity since there will normally be variations in water salinity from one point in the subterranean formation to another. The emulsion formed should also be stable with time and changes in salinity at the temperature of the formation, in order to maintain the desired reduction of permeability within the treated zone. The surfactants employed in the process of my invention comprises at least three components, one of which is an organic sulfonate primary anionic surfactant such as a $C_8$ to $C_{20}$ alkyl or alkylaryl sulfonate, or a petroleum sulfonate which is at least partially water soluble. The organic sulfonate is solubilized by a dual solubilizing co-surfactant system comprising (1) an alkylpolyalkoxyalkylene sulfonate such as an alkylpolyethoxyethylene, (or propylene, or hydroxypropylene) sulfonate, or an alkylarylpolyalkoxyalkylene sulfonate, such as an alkylbenzene, (or alkyl toluene or xylene) polyethoxyethylene, (or propylene or butylene) sulfonate, and (2) a dialkylbenzenepolyalkoxyalkylene sulfonate. The surfactant mixture may also contain a nonionic surfactant, specifically an ethoxylated aliphatic or ethoxylated alkylaryl compound such as an ethoxylated aliphatic alcohol or alkanol, or an ethoxylated alkylphenol. This process is applicable to formations containing water whose salinity is from 5,000 to 200,000 parts per million total dissolved solids.

DESCRIPTION OF THE PREFERRED EMBODIMENTS

Figure 1A:
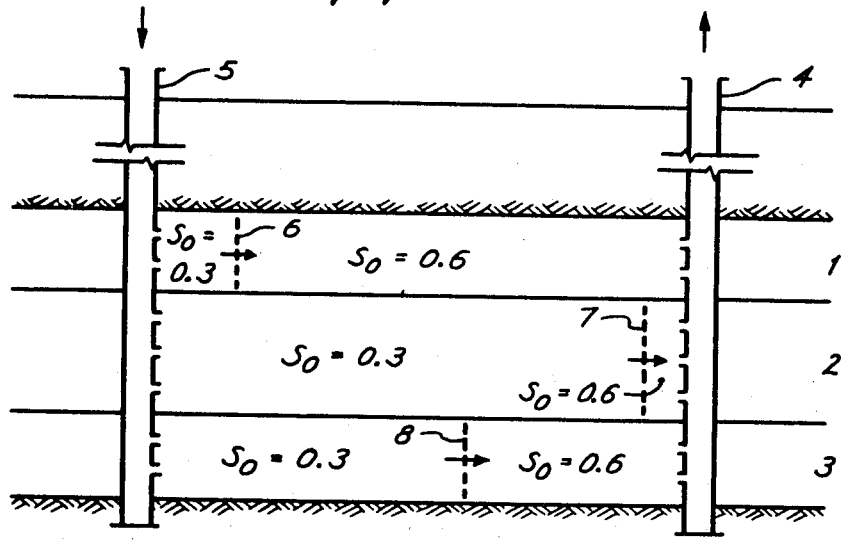
FIG. 1a illustrates a subterranean oil formation containing three zones of different permeabilities, illustrating the interface between an injected fluid and the petroleum in each zone at a time near the economic end of a water flood process.
Figure 1B:
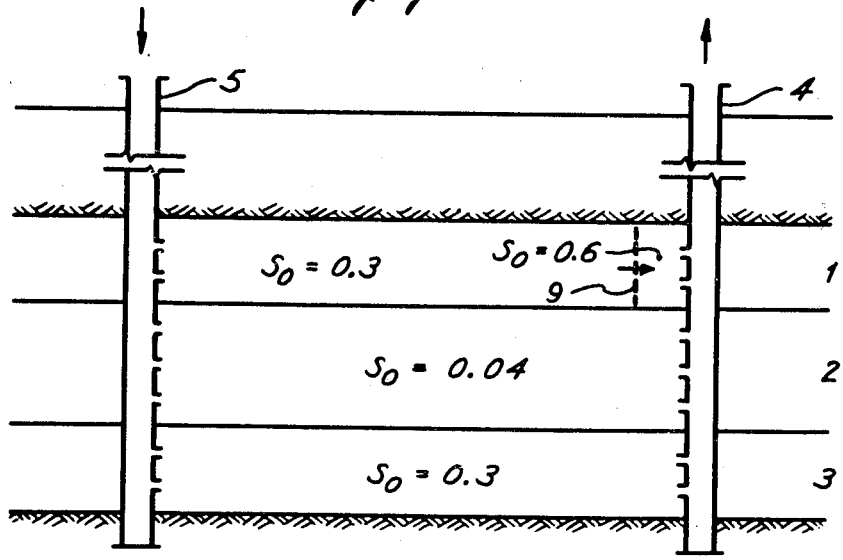
FIG. 1b illustrates the same subterranean formation, after it has been subject to the treatment of the process of this invention, and then subjected to additional water flood.

Briefly, the process of our invention comprises a method of treating a subterranean formation containing at least two zones whose permeabilities are sufficiently different from one another that a fluid injected into a well in communication with both zones will pass primarily through the more permeable zone. Ordinarily, for example, if the permeability of one zone to the flow of the injected fluid is at least 50 percent greater than and especially if it is 100 percent greater than the permeability of the other zone, fluid injected into wells in fluid communication with both zones will pass almost exclusively into the more permeable zone. For example, in a water flood applied to such a formation, water will pass into the more permeable zone exclusively and will displace petroleum towards the production well, with substantially no oil displacement occuring in the lesser permeable zone. After oil has been displaced through the more permeable zone and oil recovery has proceeded to the point at which water breakthrough has occurred at the production well, continued injection of water into the well in communication with both zones will accomplish substantially no additional oil recovery even though the oil saturation in the lesser permeable zone may be substantially the same as it was before commencing water flood or other supplemental oil recovery operations. Moreover, injecting a surfactant fluid which achieves low interfacial tension, but which produces no emulsion will have similar results, to water injection; namely, the surfactant fluid passes through the watered out, high permeability zone, bypassing the higher oil saturation, lower permeability zone.

Attempts to treat a formation such as that described above by techniques taught in the prior art have been only partially successful for a variety of reasons. Injecting a viscous fluid, which may be either an emulsion formed on the surface for the purpose of plugging the more permeable zone or an aqueous solution of a hydrophilic polymer such as polyacrylamide, partially hydrolyzed polyacrylamide, copolymers of acrylamide and acrylates, polysaccharides, etc., are generally not entirely satisfactory because the more viscous fluid only invades the largest flow channels of the formation, and so does not invade all of the flow channels which would be invaded by a fluid whose viscosity was lower, e.g. more nearly equal to the viscosity of water. Furthermore, emulsions formed by, for example, adding caustic and water to crude oil are not particularly stable with respect of time and are also not stable with respect to changes in the salinity of fluid with which they may contact. Thus an emulsion which effectively plugs the larger flow channels of a high permeability zone, including one which has previously been water flooded, may be broken later either as a consequence of the passage of time, or as the emulsion contacts pockets of water having greater or lesser salinity, such as are frequently found in most subterranean reservoirs. Moreover, there are problems associated with adsorption of hydrophilic polymers, and furthermore many of the hydrophilic polymers are not sufficiently temperature stable to allow them to be used in even moderately higher temperature formations.

The fluid injected into the formation according to the process of our invention will ordinarily be an aqueous fluid, e.g. a solution containing at least three surfactants, or surface-active agents, which are carefully chosen individually and their relative proportions selected on the basis of displaying optimum emulsification characteristics. Surfactants which are effective for this purpose, e.g. for forming gross macro-emulsions capable of plugging the flow channels of the formation, are not suitable for low surface tension flooding operations, and will not produce optimum oil displacement in a formation if utilized in a surfactant water flooding process. The difference between an emulsifying surfactant for use in our process and one suitable for use in surfactant waterflooding is in the balance between water soluble and oil soluble groups, and may only require a slight change in the number of ethoxy groups in the ethoxy sulfonates. The reason the surfactants suitable for use in the process of this invention are ineffective for waterflooding operations is believed to be associated with the fact that when an emulsion is formed, essentially all of the surface active agents which participate in the emulsification reaction, are concentrated at the interface between the discontinuous and continuous emulsion phases, and so little of the surfactants remain in the aqueous solution, and so cannot reduce the interfacial tension between formation petroleum and the aqueous fluid present in the flow channels as is necessary to achieve efficient low surface tension displacement of petroleum.

It is necessary that the surfactants utilized in the process of our invention be stable and effective for emulsification in an aqueous fluid having a salinity about equal to the average salinity of the aqueous fluid present in the flow channel of the high permeability zone, e.g. the zone into which the treating fluid is to be injected. Preferably, the surfactant should be identified by tests utilizing actual fluids from the formation, including brine and formation petroleum, since particular characteristics of any of these fluids will affect the efficiency of the surfactant for emulsification of formation petroleum and injected aqueous fluid.

The aqueous emulsifying treating fluid injected into the high permeability zone in practicing the process of our invention contains at least the following three surfactants. (1) An organic sulfonate, which may be a synthetic sulfonate having the following formula:

$$R-SO_3M$$

wherein R is an aliphatic group, including alkyl, linear or branched, having from $C_6$ to $C_{20}$ and preferably from $C_9$ to $C_{18}$ carbon atoms, or an alkylaryl group such as a benzene, toluene or xylene having attached thereto one or more alkyl groups, linear or branched, each having from $C_6$ to $C_{20}$ and preferably from $C_9$ to $C_{18}$ carbon atoms, and M is a monovalent cation such as ammonium, sodium, potassium or lithium.

The organic sulfonate may also be an ammonium, sodium, potassium, or lithium salt of petroleum sulfonate. The preferred petroleum sulfonate comprises a mixture of molecular species with equivalent weights from about 250 to 550 and a median equivalent weight in the range of from 350 to 420. (2) A sulfonated and ethoxylated surfactant having the following formula:

$$R_a(OR_a')_{na}R_a''SO_3M_a$$

wherein $R_a$ is an aliphatic group, preferably an alkyl, linear or branched, having from 9 to 25 and preferably from 12 to 18 carbon atoms, or an alkylaryl group such as benzene, toluene or xylene having attached thereto one alkyl group, linear or branched, having from 9 to 15 and preferably from 10 to 13 carbon atoms; $R_a'$ is ethylene or a mixture of ethylene and higher molecular weight alkylene with relatively more ethylene than higher molecular weight alkylene; na is a number including fractional numbers, from 2 to 10 and preferably from 3 to 7; $R_a''$ is ethylene, propylene, hydroxy propylene, or butylene; and $M_a$ is a monovalent cation such as sodium, potassium, lithium or ammonium.

(3) A sulfonated and ethoxylated dialkylaryl surfactant having the following formula:

$$R_b-(OR_b')_{nb}-R_b''SO_3M_b$$

wherein $R_b$ is a dialkylaryl group such as benzene or toluene having attached thereto at least two alkyl groups, linear or branched, each having from 1 to 18 and preferably from 3 to 12 carbon atoms; $R_b'$ is ethylene or a mixture of ethylene and higher molecular weight alkylene with relatively more ethylene than higher molecular weight alkylene, nb is a number including fractional numbers, from 2 to 10 and preferably from 3 to 7; $R_b''$ is ethylene, propylene, hydroxy propylene, or butylene; and $M_b$ is a monovalent cation such as sodium, potassium, lithium or ammonium.

The above-identified three surfactants may be substantially the only surfactant present in the treating fluid injected into the high permeability zone. In a slightly different embodiment, the following nonionic surfactant may also be used in combination with the organic sulfonate, the alkyl or alkylarylpolyalkoxyalkyl sulfonate and the dialkylarylpolyalkoxyalkyl sulfonate surfactants:

$$R_c(OR_c')_{nc}OH$$

wherein $R_c$ is a aliphatic, such as branched or linear alkyl, containing from 9 to 25 carbon atoms and preferably from 12 to 18 carbon atoms, or an alkylaryl group such as benzene, toluene or xylene having attached thereto at least one alkyl group, linear or branched, containing from 9 to 15 and preferably from 10 to 13 carbon atoms in the alkyl chain; $R_c'$ is ethylene or a mixture of ethylene and higher alkylene such as propylene with relatively more ethylene than higher alkylene; and nc is a number, either whole or fractional, from 1 to 10 and preferably from 2 to 6.

The concentration of the organic sulfonate will be from 0.2 to 5.0 and preferably from 0.75 to 3.00 percent by weight.

The concentration of the alkyl or alkylarylpolyalkoxyalkylene sulfonate surfactant will ordinarily be in the range of from about 0.01 to about 10 and preferably from about 0.5 to about 4.0 percent by weight. The concentration of dialkylarylpolyalkoxyalkylene sulfonate is in the range of from 0.1 to 5.0 and preferably from 0.4 to 2.0 percent by weight. The concentration of the nonionic surfactant, if utilized in the treating fluid in the process of our invention, will ordinarily be from about 0.1 to about 5.0 and preferably from about 0.4 to about 2.0 percent by weight. The ratio of organic sulfonate surfactant to the alkyl or alkylarylpolyalkoxyalkyl sulfonate and dialkylarylpolyalkoxyalkyl sulfonate will ordinarily be from about 0.5 to about 5.0, depending on the salinity of the fluid in which it is formulated, which in turn is usually about equal to the salinity of the fluid present in the subterranean formation.

The volume of treating fluid to be injected into the formation when applying the process of our invention is ordinarily from about 1.0 to about 100 and preferably from 10 to 50 pore volume percent, based on the pore volume of the high permeability zone or zones to be contacted by the treating fluid. It is important to note that the pore volume on which these numbers are based relate to the pore volume of the high permeability zone to be treated, not the pore volume of the whole formation.

The process of our invention is suitable for use in formations containing water of salinity from 5,000 to 150,000 ppm total dissolved solids, and whose temperature is from 65° F. (18° C.) to 250° F. (121° C.).

The procedural steps involved in applying the process of our invention to a subterranean formation are best understood by referring to the attached drawing, to which the following description applies.

A subterranean, petroleum-containing formation is located at depth of about 6200 feet, and it is determined that the total thickness of the formation is 35 feet. The average salinity of the water present in the formation is 85,000 parts per million total dissolved solids including 20,000 parts per million divalent ions, e.g. calcium and magnesium. The formation is not homogeneous in terms of permeability, however; rather, the formation is made up of three separate zones or layers. The initial oil saturation in all three layers is approximately 30 percent. Oil saturation in the drawing is designated $S_o$. Zone 1, the top layer in the formation, has a permeability of about 6 md (millidarcies) and is approximately 10 feet thick. Zone 2, the middle zone of the formation, has a permeability of about 46 md and is about 15 feet thick. Zone 3, which occupies the lower portion of the formation, is approximately 10 feet thick and has an average permeability of about 15 md.

Water is injected into injection well 5 which is in fluid communication with the full vertical thickness of the formation, i.e., all three zones of the formation. Since the permeability of zone 2 is substantially greater than either zone 1 or zone 3, water flows much more readily into zone 2, and all of the oil production obtained as a consequence of water injection is in fact derived from zone 2. It should be noted that this is not necessarily apparent to operators on the surface of the earth, however. Water injection continues and an interface is formed in each zone between the injected water flood and an oil bank that is formed as a consequence of the water flood, the three interfaces being designated as 6 in zone 1 and 7 in zone 2 and 8 in zone 3. At a time just before water breakthrough at the production well 4, the position of interfacial zones 6, 7 and 8 is shown in FIG. 1a. It can be seen that water breakthrough is about to occur at production well 4 from zone 2. Once water breakthrough occurs, further injection of water into well 5 will not recover any significant amount of additional oil from any of the three zones. All of the water injected after breakthrough of water at production well 4 will pass into and through zone 2, and essentially no additional water will pass into zones 1 and 3. Thus interfacial zone 6 and 8 will remain approximately where they are shown in FIG. 1a after breakthrough of water into the production well at zone 2, no matter how much additional water is injected into the injection well and flowed through the reservoir. At this time oil production drops off rapidly and the amount of water being produced increases rapidly until further water injection and oil production are no longer economically feasible.

The water that has been utilized for water flooding is itself from the same formation, and so the salinity of the water being injected into the formation and the salinity of water naturally present in the formation is about the same, and it is determined that in this example the salinity of this water is approximately 85,000 parts per million total dissolved solids including 20,000 parts per million divalent ions, principally calcium and magnesium. The formation temperature is 109° F. (43° C.). It is desired to formulate a treating fluid suitable for use in this salinity environments, which forms emulsions stable at this temperature, and the surfactant is chosen by a series of laboratory experiments employing actual samples of field water and petroleum from the formation into which the treating fluid is to be injected. After a series of laboratory tests, essentially similar to those to be described later hereinafter below, it is determined that a preferred emulsifying fluid for use in reducing the permeability of zone 2 contains (1) 1.3 percent by weight of a sodium petroleum sulfonate having a median equivalent weight of 375 and containing molecular species having equivalent weights evenly distributed over the range of 300–550; (2) 0.75 percent by weight of a sodium nonylbenzenepolyethoxyethylene sulfonate containing an average of 5 ethoxy groups per molecule; and (3) 0.75 percent by weight of a sodium dinonylbenzenepolyethoxypropylene sulfonate containing 3.0 moles ethylene oxide per mole of surfactant.

Since the wells are 150 feet apart, and the formation to be treated is principally zone 2, which is 15 feet thick and its porosity is 30 percent, and since it is determined that the swept area in a simple two-well pattern such as this is 11,200 square feet, the volume of formation (30% porosity) to be treated is $(11,200)(15)(0.30) = 50,400$ cu. ft.

A 20 percent pore volume or 10,080 cu. ft. slug is chosen for use in treating the above identified zone. Accordingly, the volume of the solution necessary to treat zone 2 in this example is approximately 2133 cubic meters or 75,398 gallons.

The above described emulsifying fluid is injected into injection well 5. Because the permeability of zone 2 is substantially greater than the permeability of zones 1 and 3 at that time, the difference being substantially greater than existed at the time water flooding was initiated, it is not necessary to isolate zone 2 from the other zones for the purpose of selectively injecting the fluid into zone 2. Substantially all of the fluid injected into well 5, which is in fluid communication with all three zones of the formation, will pass into zone 2. Injection of the treating fluid into zone 2, which causes an emulsion to form in zone 2, reducing the permeability of the zone and additionally recovering some additional oil therefrom, reduces the oil saturation in zone 2 to only 4 percent. Water injection into the formation is then resumed. Since the permeability of zone 2 has been decreased substantially by the foregoing treatment, water injected into well 5 will now flow principally into zones 1 and 3, and so will continue pushing the interface between the injected water and the formation petroleum toward the production well. If water from zone 3 breaks through at producing well 4 before it does from zone 1, it may be necessary to treat zone 3 with essentially the same process as was used to treat zone 2 as described above. If this is accomplished, the water injection may again be resumed, with essentially all of the water passing into zone 1. Water injection is then continued until water again breaks through at well 4, signifying that substantially all of the formation has been swept by water flooding.

After completion of the above described multi-step water flood with intermittent treatment to alleviate the adverse permeability distribution problem, the formation may thereafter be subjected to additional supplemental oil recovery processes such as, for example, surfactant flooding, since the permeability of the formation has now been made more homogeneous and there still remains a substantial amount of petroleum in zones 1 and 3 sufficient to justify the injection of an effective, low surface tension oil displacing fluid into zones 1 and 2. Alternatively, surfactant waterflooding may be applied immediately after the permeability adjusting steps, omitting the waterflooding step, using a surfactant tailored to achieve low interfacial tension displacement of petroleum. It must be recognized that the surfactants employed in this latter fluid will be different from the emulsifying fluid used in the former process treating the formation to effect a decrease in the permeability differences, according to the process of our invention described herein, and the fluids are not interchangeable, since a surfactant which effects low interfacial, tension and so exhibits optimum low tension oil displacement performance is generally ineffective for forming an emulsion for use in our process.

The difference between an optimum surfactant for emulsification and one which is optimum of low surface tension oil displacement is achieved by a slight shift in the balance between the oil soluble group (e.g. $R_a$ or $R_b$ in the above formulas, and the number of ethoxy groups present in either or both of the ethoxylated and sulfonated surfactants.

A series of emulsification test was performed to illustrate how slight changes in the molecular structure of a surfactant cause significant changes in the emulsification effectiveness of the surfactants. These tests comprising mixing 5 1 cc. of oil and 30 cc. of a 1 percent surfactant solution prepared in brine whose salinity was 85,000 parts per million total dissolved solids, heating to 109° F. (43° C.) and shaking periodically over an eight hour period. The samples were then allowed to equilibrate for several days, and the volume of emulsion and total volume of fluid (including emulsion and separate oil and water phases) were observed. The data in Table I below show the ratio of the volume of emulsion formed to the total fluid volume. It can be seen that a change of only ±0.2 in the number of moles of ethylene oxide per mole of surfactant causes a significant change in the effectiveness of the surfactant for producing an emulsion.

TABLE I

| Run | Average number of moles of EO per mole surfactant (1) | Ratio of Emulsion Volume to Total Fluid Volume |
| --- | --- | --- |
| A | 2.6 | 0.02 |
| B | 2.8 | 0.39 |
| C | 3.0 | 0.02 |
| D | 3.2 | 0.00 |
| E | 3.4 | 0.00 |

(1) 1% dodecylbenzenepolyethoxyhydroxypropylene sulfonate.

For the purpose of further illustrating the types of fluids suitable for use in the process of our invention, and illustrating the results obtainable from application thereof, a series of laboratory experiments were performed. Laboratory equipment was especially constructed for these tests, and comprised essentially two separate formation earth core samples encased in holders and arranged for flooding, with the two cores being placed in parallel to simulate the situation similar to that described above, in which an injection well is in communication with two earth strata of substantially different permeabilities. Fluids injected into the apparatus will pass predominantly through the highest permeability core to the exclusion of the other core. In all of the experiments described below, the cores were separately water flooded to an irreducable oil saturation prior to being connected in parallel for the purpose of studying the effect of the adverse permeability distribution-correcting treatment of my invention.

In run F, two packs of crushed formation core material were formulated and cleanes. The packs were 3.49 cm in diameter and 20 cm in length and had a total pore volume of 56 cubic centimeters. The porosity of pack 1 was 29 percent and the permeability was 208 millidarcy. The residual oil saturation after water flooding was 27 percent. Pack 2 utilized in Run F had a pore volume of 44 cubic centimeters and a porosity of 23 percent, but a much lower permeability, only 14 millidarcy. The residual oil saturation of Pack 1 after water flooding was 32 percent. After the packs were flooded to irreducable water saturation and mounted in parallel, water injection into the cores at a flow rate of 0.9 cc per minute resulted in a receptivity ratio (the ratio of the volume of fluid injected into Pack 1 divided by the volume of fluid injected into Pack 2 during the same period, when the cores are connected in parallel) of approximately 11.7. During the treatment with 3.0% sodium dinonylbenzene (4.8) polyalkoxyethylene sulfonate solution the receptivity ratio declined to 6.4 and levelled off at 5.3 during the subsequently applied water flood operation. A quantity of petroleum sulfonate solution was then injected, and during the surfactant flood portion of the test, the receptivity declined still further to 3.1. A polymer mobility control buffer was then injected into the system, and the receptivity ratio increased to 1.3 after 0.5 pore volumes of the polymer solution had been injected, and then rose to 2.2 after 4.0 pore volumes of polymer had been injected. It is believed that the increase in receptivity ratio resulting from the fact that the polymer was dissolved in fresh water, which broke some of the emulsion formed in the course of the treatement procedure described above. Nevertheless, Run F clearly illustrates how treatment of two cores in a parallel arrangement, which cores have widely different permeabilities, can reduce the permeability deviation between the two cores and improve the receptivity ratio.

Run G was performed using packs of crushed limestone to verify that in situ emulsification was the mechanism responsible for the improvement in receptivity noted in experiment F above. Pack 3 was saturated with crude oil and pack 4 was not. Pack 3 was water flooded to an irreducable oil saturation prior to the treatment. Both packs were treated with 13 pore volume percent of a 30 kilogram/meter$^3$ solution of dinonylphenol-polyethoxyethyl sulfonate (3.8 ethoxy groups per molecule average) and finally flooded with field brine. In this experiment, the packs were not flooded in parallel as was the case in Run F above but rather were independently flooded after treatment with the emulsifying fluid. The pressure differential across the packs was determined during the course of the treatment and subsequent water flood as an indication of increasing resistance to fluid flow through the packs. Pack 3, which was originally saturated with oil, water flooded and then treated, experienced a four-fold increase in the pressure required to flood with water in a constant rate flood whereas pack 4, which contained essentially no oil prior to the treatment, experienced less than a 50 percent increase in differential pressure during the course of approximately 3 pore volumes of water flood. Run G clearly illustrates that oil must be present in the treated formation for the injectivity-reducing emulsification phenomena to be achieved, which is necessary for the treatment described herein to accomplish the desired objective of reducing the permeability of the high permeability zone.

Run H was similar to Run F, except the treating solution contained 13.6 kg/m$^3$ dodecylbenzene (3.0) polyethoxyethylene sulfonate with 7.6 kg/m$^3$ 3.0 mole ethylene oxide adduct of dodecyl phenol. Pack 5 had 96 millidarcy permeability and Pack 6 had 20 millidarcy permeability. After the packs were each flooded to irreducable water saturation and mounted in parallel, water injection into the cores at a flow rate of 1.0 cm$^3$ per minute in A receptivity ratio (Pack 5/Pack 6) of 4.6. During the treatment procedure, the receptivity ratio decline to 2.8 and levelled off at 1.0 during the subsequently applied water flood operation. A receptivity ratio of 1 was maintained during injection of petroleum sulfonate solution and the ratio fluctuated between 1.6 and 0.6 during a polymer solution injection. Experiment H clearly illustrates that the sulfonate-nonionic mixture can be used to reduce the permeability deviation between two packs.

Experiment I was conducted to evaluate the specific preferred embodiment of this invention, employing petroleum sulfonate and dual sulfonated and ethoxylated solubizing cosurfactants. Two fluids were employed. The first fluid contained the following component:

3.6 percent sodium dinonylbenzene (4.8) polyethoxyethylene sulfonate.

The second fluid contained the following 3 components:
(1) 1.5% sodium nonylbenzene (6.0) polyethoxyethylene sulfonate,
(2) 1.1% Witco TRS 18 ® petroleum sulfonate,
(3) 2.5% Witco TRS 40 ® petroleum sulfonate.

No isolation slug was used between the two fluids to enhance mixing of these fluids in the cores. The salinity of each solution was 90,000 parts per million total dissolved solids and total hardness of 25,000 ppm as calcium carbonate. It can be seen from the data in Table II below that a severe injection ratio of 8.7 was corrected to very nearly unity by our process.

tially in that emulsification is delayed somewhat and greater in depth treatment is achieved.

Thus we have disclosed and demonstrated how it is possible to treat a formation containing two or more strata of substantially different permeabilities so as to reduce the permeability of the more permeable strata, by injecting one or more emulsifying fluids thereinto which form a gross macro-emulsion with residual oil remaining in the flow channels of the flooded portion of a formation after water flooding, thereby reducing the permeability difference between the strata, after which water or other oil displacing fluids may be injected into the formation with substantially improved vertical conformance over that which would be obtained without the permeability adjusting treatment of our invention.

While our invention has been described in terms of a number of illustrative embodiments, it is clearly not so limited since many variations thereof will be apparent to persons skilled in the art of oil recovery without departing from the true spirit and scope of our invention. It is our desire and intention that our invention be limited only by those limitations and restrictions appearing in the claims appended immediately hereinafter below.

We claim:
1. A method of recovering petroleum from a subterranean, petroleum-containing formation, said formation containing water whose salinity is from 5,000 to 220,000 parts per million total dissolved solids, said formation containing at least two distinct pertoleum-containing strata, the permeability of at least one of said strata being at least 50 percent greater than the permeability of the other stratum, said formation being penetrated by at least one injection well and by at least one production well, both wells being in fluid communication with substantially all of said formation, comprising
(a) injecting a first aqueous oil-displacing fluid into the formation via the injection well, said fluid passing through at least one of the more permeable strata of said formation and displacing oil therein toward the production well, from which it is recovered to the surface of the earth;
(b) after said first aqueous oil displacing fluid has passed through at least one of said more permeable strata to the production well, discontinuing injecting said fluid and injecting into said stratum at least one aqueous fluid containing an emulsifying surfactant mixture comprising

TABLE II

| Run | Core or Pack | Initial Permeability to Water | Volume of Treating Fluid | Material Used | Receptivity Ratios Prior To Treatment | After Treatment | ΔP After Treatment / ΔP Before Treatment |
|---|---|---|---|---|---|---|---|
| F | 1 | 209 | 0.15$^2$; 0.27$^4$ | | | | |
|   | 2 | 15 | 0.03$^2$; 0.11$^4$ | | | | |
| G | 3 | 75 | 0.13 | 2 | — | — | 4.0 |
|   | 4 | 65 | 0.17 | | — | — | 1.4 |
| H | 5 | 96 | | 3 | 4.6 | 1.0 | — |
|   | 6 | 20 | | | | | |
| I | 7 | 133 | 0.15$^2$; 0.22$^4$ | | 8.7 | 0.8–1.4 | |
|   | 8 | 10 | 0.04$^2$; 0.17$^4$ | | | | |

[1] Reduced to 2.4 on injecting petroleum sulfonate oil displacing fluid
[2] Dinonylphenol (3.8) polyethoxyethyl sulfonate
[3] Dodecylphenol (3.0) polyethoxyethyl sulfonate + dodecylphenol (3.0) polyethoxylate
[4] Petroleum sulfonate plus dinonylbenzene (4.8) polyethoxyethylene sulfonate plus nonylbenzene (6.0) polyethoxyethylene sulfonate While portions of the above description of the preferred embodiments disclose mixing all of the surfactants in one fluid and injecting them into the formation, two or more fluids each containing one or more of the essential surfactants may be injected sequentially to achieve mixing in the formation. In certain applications, there is an advantage to injecting the materials sequen- (1) from 0.2 to 5 percent by weight of an organic sulfonate comprising an alkyl or alkylaryl sulfonate having the following formula:

$$R-SO_3M$$

wherein R is an alkyl group containing from 6 to 20 carbon atoms, or an alkylaryl group selected from the group consisting of benzene, toluene or xylene having attached thereto at least one alkyl containing from 6 to 20 carbon atoms, and M is ammonium, sodium, potassium, or lithium, or a sodium, potassium, lithium, or ammonium salt of petroleum sulfonate which is at least partially water soluble and has a median equivalent weight in the range of 350 to 420;

(2) from 0.01 to 5.0 percent by weight of a dialkylarylpolyalkoxyalkylene sulfonate having the following formula:

$$R_a(OR_a')_{na}R_a''SO_3M_a$$

wherein $R_a$ is a dialkylaryl group selected from the group consisting of benzene and toluene having attached thereto at least two alkyl groups, each having from 3 to 14 carbon atoms, $R_a'$ is ethylene or a mixture of ethylene and higher alkylene with relatively more ethylene than higher alkylene, na is a number from 2 to 10, $R_a''$ is ethylene, propylene, hydroxypropylene or butylene, and $M_a$ is ammonium, sodium, potassium or lithium; and (3) from about 0.01 to about 10.0 percent by weight of an alkylpolyalkoxyalkylene sulfonate or alkylarylpolyalkoxyalkylene sulfonate having the following formula:

$$R_b-(OR_b')_{nb}-R_b''SO_3M_b$$

wherein $R_b$ is an alkyl group having from 9 to 25 carbon atoms or an alkylaryl group selected from the group consisting of benzene, toluene or xylene having attached thereto one alkyl group, having from 9 to 15 carbon atoms; $R_b'$ is ethylene or a mixture of ethylene and higher molecular weight alkylene with relatively more ethylene than higher molecular weight alkylene; nb is a number from 2 to 10, $R_b''$ is ethylene, propylene, hydroxy propylene, or butylene and $M_b$ is a monovalent cation selected from the group consisting of sodium, potassium lithium and ammonium, said emulsifying surfactant mixture forming a macro-emulsion in the flow channels of the most permeable strata of the formation, thereby reducing the permeability of the strata invaded by the emulsifying fluid; and (c) thereafter injecting a second aqueous oil displacing fluid into the formation, said oil displacing fluid invading at least one stratum not invaded by the oil displacing fluid of step (a) above, displacing petroleum therein toward the production well where it is recovered to the surface of the earth.

2. A method as recited in claim 1 wherein the first oil displacing fluid is water.

3. A method as recited in claim 1 wherein the second oil displacing fluid is water.

4. A method as recited in claim 1 wherein the emulsifying fluid also contains a nonionic surfactant having the following formula:

$$R_c(OR_c')_{nc}OH$$

wherein $R_c$ is an alkyl group containing from 9 to 25 carbon atoms, or an alkylaryl group selected from the group consisting of benzene, toluene and xylene having attached thereto at least one alkyl containing from 9 to 15 carbon atoms, $R_c'$ is ethylene or a mixture of ethylene and propylene with relatively more ethylene than propylene; and nc is a number from 2 to 10.

5. A method as recited in claim 1 wherein $R_b$ is an alkyl group containing from 12 to 18 carbon atoms.

6. A method as recited in claim 1 wherein $R_b$ is alkylaryl group and the number of carbon atoms in the alkyl group is from 10 to 13.

7. A method as recited in claim 6 wherein $R_b$ is alkylbenzene.

8. A method as recited in claim 1 wherein $R_a'$ is ethylene.

9. A method as recited in claim 1 wherein $R_b'$ is ethylene.

10. A method as recited in claim 1 wherein the value of na is from 2 to 7.

11. A method as recited in claim 1 wherein the value of nb is from 2 to 7.

12. A method as recited in claim 1 wherein $R_a''$ is ethylene.

13. A method as recited in claim 1 wherein $R_b''$ is ethylene.

14. A method as recited in claim 1 wherein $R_a''$ is propylene.

15. A method as recited in claim 1 wherein $R_b''$ is propylene.

16. A method as recited in claim 1 wherein $R_a''$ is hydroxy propylene.

17. A method as recited in claim 1 wherein $R_b''$ is hydroxy propylene.

18. A method as recited in claim 1 wherein $R_a''$ is butylene.

19. A method as recited in claim 1 wherein $R_b''$ is butylene.

20. A method as recited in claim 4 wherein the ratio of the nonionic surfactant to the sum of the alkylpolyalkoxyalkylene sulfonate or alkylarylpolyalkoxyalkylene and the dialkylarylpolyalkoxyalkylene sulfonate is from about 0.5 to about 5.0.

21. A method as recited in claim 1 wherein the volume of emulsifying surfactant-containing fluid is from about 1.0 to about 100 pore volume percent based on the pore volume of the strata to be treated thereby.

22. A method as recited in claim 21 wherein the volume of fluid is from about 10 to about 50 pore volume percent.

23. A method as recited in claim 1 wherein said formation contains at least three strata, each differing in permeability from one another, and the steps of injecting said emulsifying surfactant-containing fluid and then resuming injecting said aqueous oil-displacing fluid are applied to the formation at least twice.

24. A method as recited in claim 23 wherein the steps of injecting said emulsifying surfactant-containing fluid and said aqueous oil-displacing fluid are repeated until oil-displacing fluid has swept substantially all of the petroleum-containing strata of said formation.

25. A method of recovering petroleum from a subterranean, petroleum-containing formation, said formation containing water whose salinity is from 5,000 to 220,000 parts per million total dissolved solids, said formation containing at least two distinct petroleum-containing strata, the permeability of at least one of said strata being at least 50 percent greater than the permeability of the other stratum, and formation being penetrated by at least one injection well and by at least one production well, both wells being in fluid communication with said formation strata, comprising
   (a) injecting a first aqueous fluid comprising an oil-displacing fluid into the formation via the injection well, said fluid passing through at least one of the more permeable strata of said formation and displacing oil therein toward the production well, from which it is recovered to the surface of the earth;
   (b) after said first aqueous fluid has passed through at least one of said more permeable stratum to the production well, discontinuing injecting said fluid and injecting into said stratum a second aqueous fluid containing from 0.2 to 5.0 percent by weight of an organic sulfonate comprising an alkyl sulfonate or alkylaryl sulfonate having the following formula:

$$R—SO_3M$$

wherein R is an alkyl containing from 6 to 20 carbon atoms, or an alkylaryl selected from the group consisting of benzene, toluene or xylene having attached thereto at least one alkyl containing from 6 to 20 carbon atoms, and M is ammonium, sodium, potassium, or lithium, or a sodium, potassium, lithium, or ammonium salt or petroleum sulfonate which is at least partially water soluble and has a median equivalent weight in the range of 350 to 420;
   (c) injecting a third aqueous fluid containing from 0.01 to 5.0 percent by weight of a dialkylaryl-polyalkoxyalkylene sulfonate having the following formula:

$$R_a(OR_a')_{na}R_a''SO_3M_a$$

wherein $R_a$ is a dialkylaryl selected from the group consisting of benzene and toluene having attached thereto at least two alkyl groups each having from 3 to 14 carbon atoms, $R_a'$ is ethylene or a mixture of ethylene and higher alkylene with relatively more ethylene than higher alkylene, na is a number from 2 to 10, $R_a''$ is ethylene, propylene, hydroxypropylene or butylene, and $M_a$ is ammonium, sodium, potassium or lithium;
   (d) injecting a fourth aqueous fluid containing from 0.01 to 10.0 percent by weight of an alkylpolyalkoxyalkylene sulfonate or alkylarylpolyalkoxyalkylene sulfonate having the following formula:

$$R_b—(OR_b')_{nb}—R_b''SO_3M_b$$

wherein $R_b$ is an alkyl having from 9 to 25 carbon atoms or an alkylaryl selected from the group consisting of benzene, toluene or xylene having attached thereto one alkyl group having from 9 to 15 carbon atoms; $R_b'$ is ethylene or a mixture of ethylene and higher molecular weight alkylene with relatively more ethylene than higher molecular weight alkylene; nb is a number from 2 to 10, $R_b''$ is ethylene, propylene, hydroxy propylene, or butylene and $M_b$ is a monovalent cation selected from the group consisting of sodium, potassium lithium and ammonium;
   (e) said second, third and fourth fluids being injected sequentially to mix in the stratum of the formation invaded by the first aqueous fluid, forming a macro-emulsion in the flow channels of said stratum, thereby reducing the permeability of said stratum invaded by the emulsifying fluid; and
   (f) thereafter injecting a fifth aqueous fluid comprising an aqueous oil displacing fluid into the formation, said oil displacing fluid invading at least one stratum not invaded by the oil displacing fluid of step (a) above, displacing petroleum therein toward the production well where it is recovered to the surface of the earth.

* * * * *